US006144985A

United States Patent [19]

Rompe

[11] Patent Number: 6,144,985

[45] Date of Patent: Nov. 7, 2000

[54] METHOD AND ARRANGEMENT FOR DETERMINING DISTRIBUTION INFORMATION

[75] Inventor: Andre Rompe, Berlin, Germany

[73] Assignee: Siemens Aktiengesellschaft, Munich, Germany

[21] Appl. No.: 09/181,758

[22] Filed: Oct. 29, 1998

[30] Foreign Application Priority Data

Oct. 29, 1997 [DE] Germany ........................... 197 47 768

[51] Int. Cl.[7] .................................................. G06F 13/00

[52] U.S. Cl. ........................................... 709/200; 382/101

[58] Field of Search ........................... 209/584; 235/462; 382/100, 101, 102; 709/200

[56] References Cited

U.S. PATENT DOCUMENTS 3,760,161 9/1973 Lohne et al. ............................ 235/462

5,031,223 7/1991 Rosenbaum et al. ................... 382/100

*Primary Examiner*—Robert B. Harrell

*Attorney, Agent, or Firm*—Venable; George H. Spencer; Catherine M. Voorhees

[57] ABSTRACT

The invention relates to the determination of distribution information located on the surface of mailed items located in a plurality of processing machines (ILV), with the images with the distribution information being recorded and automatically read in each machine. Unrecognized distribution information is determined by means of video-encoding locations (VCD) via a network. According to the invention, the images of the mailed items whose distribution information could not be read automatically during temporary storage are stored and administered in each processing machine. Status information about the degree of fullness of the temporary storage is exchanged regularly between the processing machines, and from this information, ranking-order values for all processing machines are determined in each processing machine. As needed, each video-encoding location requests the ranking-order values from a random processing machine, and, with an individual chance process, uses them to determine the processing machine from which the next image will be requested.

11 Claims, 3 Drawing Sheets

PRIOR ART

METHOD AND ARRANGEMENT FOR DETERMINING DISTRIBUTION INFORMATION

CROSS REFERENCE TO RELATED APPLICATION

This application claims the priority of German Application No. 197 47 768.2 filed Oct. 29, 1997, which is incorporated herein by reference.

BACKGROUND OF THE INVENTION

The invention relates to a method and an arrangement for determining distribution information located on the surface of mailed items.

To determine distribution information, the addresses of mailed items are read in processing machines, particularly sorting machines having OCR systems. The mailed items that are not read by the OCR system are represented on video displays of a video-encoding system, and are manually encoded. A video-encoding system can be connected to a plurality of letter-sorting systems in a pool configuration. In this instance, all of the images of non-machine-read letters (i.e., OCR rejects) that have exited the different machines are to be distributed to a system of video-decoding locations, according to specific instructions, for the purpose of video decoding; both a uniform distribution of the load and a defined prioritization of certain machines may be required.

According to the prior art, the online images of the mailed items that exit all of the processing machines are managed by a central administrator, for example an image controller, and, upon the request of a video-encoding location, the images are shunted to the requesting video-encoding location. "Online images" refers to images that are located in a mechanical operating-time path of the processing machines at the relevant time. The operating-time paths are necessary for encoding the mailed items online, that is, by passing them through a machine, or manually through video encoding. As a result of the encoding, a machine-readable code is printed on the mailed items, which can be read in subsequent machines.

Depending on the nature of the allocation of encoding jobs of the video-encoding locations to the different processing machines, the image controller controls the load of each individual machine and the load distribution in the entire system pool.

A disadvantage of this solution is the fact that all encoding requests of the video-encoding location that are relevant for a single instance are sent to the image controller. With high loads, this can cause a bottleneck effect, because the central image controller must process each encoding request of a video-encoding location. FIG. 3 shows the principle of the central image administration with the image controller.

SUMMARY OF THE INVENTION

It is therefore the object the invention to provide a method and an accompanying arrangement that effect a dispatch with reduced waiting times, with a simultaneous request for images from the processing machines by the video-encoding locations for manual encoding.

Various advantageous embodiments of the invention are achieved as will become apparent from the following description. For example, an embodiment for forming the ranking-order values, an embodiment for incorporating a chance number into the selection of the processing machine corresponding to the ranking-order value, and an embodiment handling different encoding modes are disclosed.

The solution of the invention offers the following advantages over known centralized approaches:

- no central image administration for the allocation and distribution of images;
- bottleneck effect is impossible under high loads;
- very few software components;
- continuous, uniform load distribution to all machines and encoding locations;
- inherent stability; and
- simple incorporation of offline mailed items and different encoding modes.

BRIEF DESCRIPTION OF THE DRAWINGS

The invention is described in detail by way of an embodiment in conjunction with the drawings wherein.

DETAILED DESCRIPTION OF THE INVENTION

Figure 1:
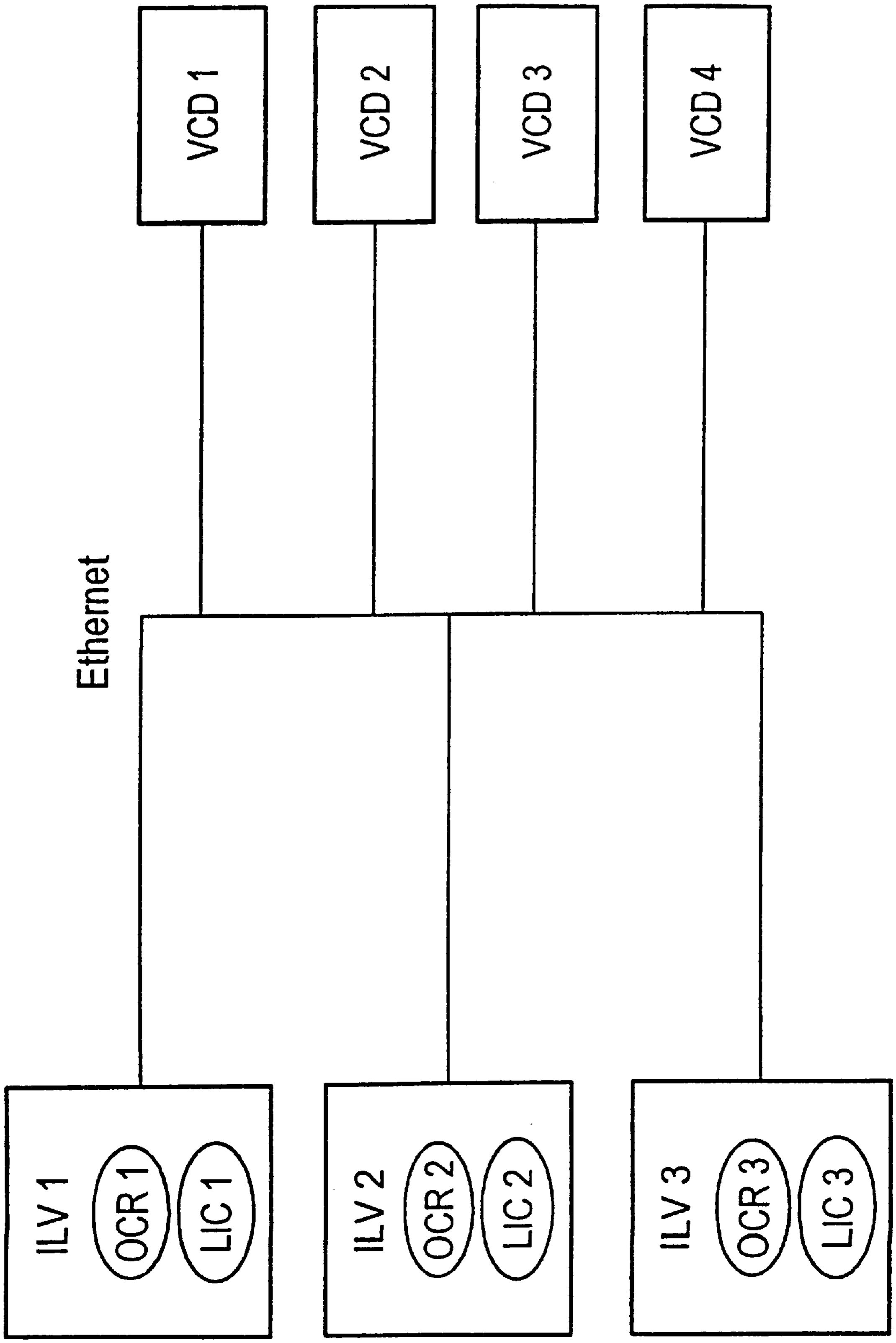
FIG. 1 shows a fundamental representation of the arrangement of the invention having a local image administration.

Each sorting machine ILV 1, 2, 3 includes an OCR system and a local image-administration unit LIC, which manages the online and offline images. The sorting machine ILV and all of the video-encoding locations VCD 1, 2, 3, 4 are connected to one another by way of a network. FIG. 1 shows the arrangement with local image administration.

The principle of the solution according to the invention is based on the fact that each video-encoding location VCD 1–4 independently ascertains from which machine ILV 1–3 it will request the next image to be processed. The decision is based on status information supplied in a suitable manner to the video-encoding locations by all participating processing machines. The following cycle ensues for image requests of a video-encoding location:

1. The determination of the image-administration unit LIC from which the next image is to be requested;
2. The image request from the appropriate image-administration unit LIC;
3. The reception of the image data and associated image descriptor from the addressed system;
4. The encoding of the image; and 5. The transmission of the encoding results back to the image-administration unit LIC.

For selecting the processing machine from which the next image is to be requested, each processing machine supplies status information about the degree of fullness in cyclical intervals, for example in the form of degree-of-fullness information H represented similarly to a histogram.

The mechanical operating-time path is disposed in the mailed-item flow of the processing machine, before a barcode printer, and is responsible for ensuring the automatic recognition of distribution information (OCR), as well as for the delay time necessary for video encoding. The mailed-item feeder at the beginning of the operating-time path is controlled by a regulator such that the online rate is maximized during a maximum total throughput. The online rate is the relative proportion of mailed items that could be encoded within the time the items are located in the operating-time path.

To calculate the histogram-like degree-of-fullness information H, equidistant intervals of, for example, one second are formed, and the respective number of mailed items of a segment of the operating-time path is allocated to the corresponding entries. Diagram 1 shows an instantaneous recording of the histogram-like degree-of-fullness information H of a 12-second operating time path at a time ti. As can be seen from the diagram, four mailed items are in the operating-time interval up to the first second, six mailed items are present in the operating-time path from the first to second seconds, etc. In the example, the operating-time path is completely filled.

The operating-time path transports the mailed items continuously. The model of the histogram-like degree-of-fullness information is discrete in time. The scanning or updating rate of the histogram-like degree-of-fullness information is set in a suitable ratio to the transport speed, the parameters and length of the mailed items, the gap between mailed items and the size of the equidistant intervals. In the embodiment, the updating rate and the size of the equidistant intervals are each one second.

| Operating time [s] | 1 | 2 | 3 | 4 | 5 | 6 | 7 | 8 | 9 | 10 | 11 | 12 |
|---|---|---|---|---|---|---|---|---|---|---|---|---|
| No. of mailed items | 4 | 6 | 7 | 9 | 7 | 2 | 8 | 9 | 10 | 9 | 6 | 3 |

Diagram 1: Degree-of-Fullness Information for a 12-Second Operating-Time Path at Time ti.

The mailed items are fed into the operating-time segment by a supply device called a feeder. After passing through the operating-time path, they enter the sorting region of the letter-sorting system, for example an arrangement of sorting compartments that are actuated by way of switches. The mailed items pass through the operating-time path in accordance with the FIFO (First In, First Out) principle. The value of the histogram-like degree-of-fullness information H therefore passes through from left to right.

The method of local image administration is described below.

1. Each letter-sorting system cyclically determines a histogram-like degree-of-fullness information H(ti) of the operating-time path for the mailed items that were not read by the OCR at the updating rate Ra [1/sec]. This information represents the degree of fullness with mailed items between the times ti and ti+1.
2. The histogram-like degree-of-fullness information Hj (ti) of all j machines is exchanged among the sorting machines at cyclical intervals, so each machine possesses all of the information about the degree of fullness of all of the machines. In this way, a video-encoding location can query an arbitrary machine about the status information of all of the machines, and correspondingly reach the decision of choosing the system from which the next image should be requested.
3. Ranking-order values are calculated for each system from the histogram-like degree-of-fullness information H (ti) of the operating-time path. The ranking-order values Ri are, for example, positive whole numbers. The relationships of the amounts of the ranking-order values represent the ratios of the degrees of fullness of the participating systems.
4. The video-encoding locations obtain the respectively current ranking-order values of all of the machines at defined times that they themselves establish. In comparison to the image data, the current ranking-order values contain only relatively small quantities of data, and can therefore be requested by the video-encoding location immediately after an encoding process has ended. As an alternative, this can be associated with the transmission of the images, that is, when a video-encoding location requests an image from an image-administration unit, the current ranking-order values of all of the systems can be transmitted in addition to the image data. This reduces the number of necessary messages.
5. For each image to be requested, each video-encoding location employs an individual decision process to determine from which system the next image will be requested. For this purpose, the current ranking-order values Ri are used. According to the invention, the ranking-order values are superposed with a uniformly-distributed chance process Z such that the probability Pi of the request for an image from a certain machine i is proportional to the relative size of the relevant ranking-order value Ri according to Formula (I):

$$Pi = \frac{Ri}{\sum Ri} \tag{I}$$

The random superposition for the process of deciding from which system the next image will be requested is necessary for avoiding a situation in which all of the video-encoding locations simultaneously request images possessing the maximum ranking-order value from the sorting system. This would otherwise be a possibility, because in principle all of the video-encoding locations possess the same information about the degree of fullness of mailed items for the sorting systems at one time, in the form of the histogram-like degree-of-fullness information H (ti) of the operating-time path. Furthermore, the chance superposition ensures the most uniform possible load distribution between all of the video-encoding locations and the sorting machines according to the ranking order.

6. The determination of the ranking-order value and chance-process superposition are effected such that the online rate is maximized, and the total system throughput is maximized.

Linear and nonlinear superposition of functions between the operating time Di of the operating-time path and the relevant number of mailed items Ni in the observed operating-time path segment are considered in determining the ranking-order value. For example, in a simple case, the ranking-order value can be determined as the sum of all degrees of fullness, i.e., the total number of mailed items located in the operating-time path (IIa). In another approach, the current position can be incorporated in linear or nonlinear fashion into the ranking-order value (IIb and IIc). On the other hand, only a relevant (but variable) portion of the operating-time path can be used in the determination of the ranking-order value; for example, in (IId), only the last io positions having degrees of fullness unequal to zero are used. Finally, in (IIe), only the squares of the last positions are used for calculating the ranking-order value.

$$Ri = \sum_{i=0}^{k} Ni \tag{IIa}$$

$$Ri = \sum_{i=0}^{k} (DiNi) \tag{IIb}$$

$$Ri = \sum_{i=0}^{k} (Di^2 Ni) \tag{IIc}$$

$$Ri = \sum_{i=io}^{k} (Di^2 Ni) \tag{IId}$$

$$Ri = \sum_{i=io}^{k} (Di^2) \tag{IIe}$$

In certain operating cases, prioritization is desirable (e.g. if a machine is filled with online mail). The necessary nonuniform distribution of the machine load can be attained by an additional factor in the determination of the ranking sequence; the factors are determined corresponding to the priority of the respective machine.

For each necessary encoding mode, histogram-like degree-of-fullness information is administered by the local image-administration units LIC 1, 2, 3, 4 which communicate with the other participating local image-administration units. If the video-encoding locations VCD 1, 2, 3, 4 are operated in different encoding modes, each one only requests the ranking-order values relevant for its mode from a local image-administration unit, and uses them to determine from which sorting machine the next image will be requested.

The local image-administration method of the invention requires that the histogram-like degree-of-fullness information H(ti) be exchanged cyclically among the participating local image-administration units LIC1 through LIC4.

Figure 2:
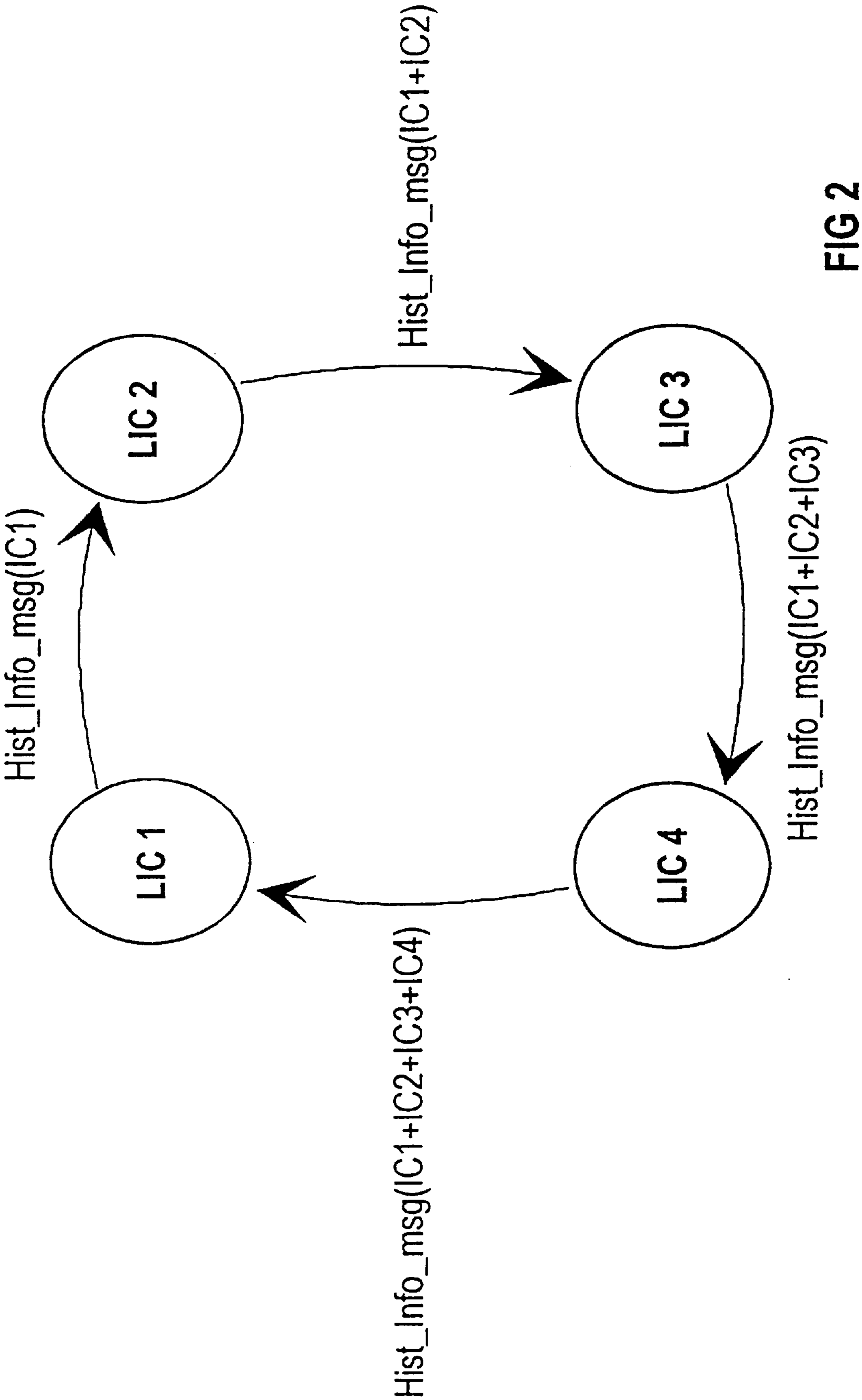
FIG. 2 shows the procedure of an exchange of the degree-of-fullness information, shown in a form similar to a histogram.
Figure 3:
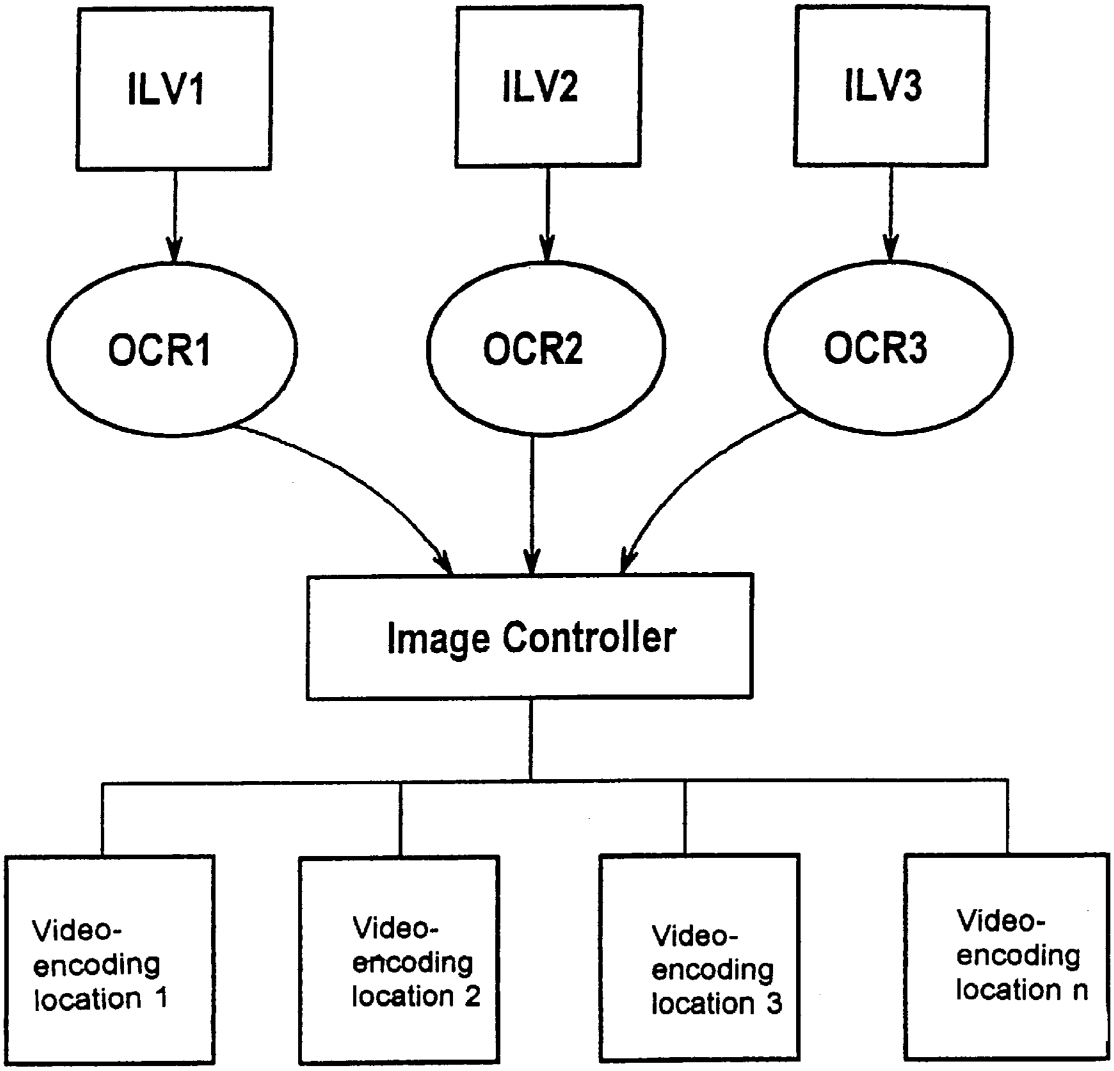
FIG. 3 shows a fundamental representation of an arrangement according to the prior art, having a centralized image administration.

FIG. 2 illustrates the principle in accordance with which the degree-of-fullness information Hist is conducted further from one local image-administration unit LIC1–LIC4 to the next. Each image-administration unit LIC further conducts the histogram-like information obtained from the other image-administration units LIC, and supplements the information with its own updated values. This approach involves minimal exchanged information or messages.

The way of conveying the histogram-like messages around the LIC's is illustrated with the following table. Two cycles of the histogram-like messages around the LIC's are shown, each cycle consisting of four messages.

| LIC1 $t_1$ | LIC2 $t_2$ | LIC3 $t_3$ | LIC4 $t_4$ | LIC1 $t_5$ | LIC2 $t_6$ | LIC3 $t_7$ | LIC4 $t_8$ |
|---|---|---|---|---|---|---|---|
| $H_1(t_1)$ | $H_1(t_1)$ + $H_2(t_2)$ | $H_1(t_1)$ + $H_2(t_2)$ + $H_3(t_3)$ + | $H_1(t_1)$ + $H_2(t_2)$ + $H_3(t_3)$ + $H_4(t_4)$ | $H_1(t_5)$ + $H_2(t_2)$ + $H_3(t_3)$ + $H_4(t_4)$ | $H_1(t_5)$ + $H_2(t_6)$ + $H_3(t_3)$ + $H_4(t_4)$ | $H_1(t_5)$ + $H_2(t_6)$ + $H_3(t_7)$ + $H_4(t_4)$ | $H_1(t_5)$ + $H_2(t_6)$ + $H_3(t_7)$ + $H_4(t_8)$ |

First cycle

1. LIC1 sends its histogram-like degree-of-fullness information $H_1(t_1)$ at time $t_1$ to LIC2.
2. LIC2 adds its current histogram-like degree-of-fullness information $H_2(t_2)$ to $H_1(t_1)$ and sends $H_1(t_1)$, $H_2(t_2)$ at time $t_2$ to LIC3.
3. LIC3 adds its current histogram-like degree-of-fullness information $H_3(t_3)$ to $H_1(t_1)$ $H_2$ $(t_2)$ and sends $H_1(t_1)$, $H_2(t_2)$ $H_3(t_3)$ at time $t_3$ to LIC4.
4. LIC4 adds its current histogram-like degree-of-fullness information $H_4(t_4)$ to $H_1(t_1)$, $H_2(t_2)$, $H_3(t_3)$ and sends $H_1(t_1)$, $H_2(t_2)$, $H_3(t_3)$, $H_4(t_4)$ at time $t_4$ to LIC1.

Second cycle (e.g., about one second later)

5. LIC1 updates $H_1(t_1)$ by $H_1(t_5)$ and sends $H_1(t_5)$, $H_2(t_2)$, $H_3(t_3)$, $H_4(t_4)$ at time $t_5$ to LIC2.
6. LIC2 updates $H_2(t_2)$ by $H_2(t_6)$ and sends $H_1(t_5)$, $H_2(t_6)$, $H_3(t_3)$, $H_4(t_4)$ at time $t_6$ to LIC3.
7. LIC3 updates $H_3(t_3)$ by $H_3(t_7)$ and sends $H_1(t_5)$, $H_2(t_6)$ $H_3(t_7)$, $H_4(t_4)$ at time $t_7$ to LIC3.
8. LIC4 updates $H_4(t_4)$ by $H_4(t_8)$ and sends $H_1(t_5)$, $H_2(t_6)$, $H_3(t_7)$, $H_4(t_8)$ at time $t_8$ to LIC1.

Third cycle (e.g., about one second later)

continues as above.

In this way, after a message has been circulated, all of the local image-administration units LIC possess the same information status. After the data matching, each local image-administration unit LIC calculates the ranking-order values Ri for each system according to the same calculation rules. These values are then queried by the video-encoding locations as needed.

The objective of the chance superposition is to reach a decision for the selection of a processing machine (ILV) for the next image request, based on the list of current ranking-order values Ri. In accordance with the invention, a chance decision is made that assures a system-selection probability that corresponds to the relationships of the ranking-order values Ri.

The chance superposition can be effected, among other ways, in the following manner:

In a chance process, a positive, whole number between 1 and N is generated. Depending on the calculated ranking-order values Ri of the machines, an interval Li is defined for each machine (ILV) corresponding to the relative rank Ri.

$$Li = \frac{N * Rj}{\sum Ri} \tag{III}$$

The intervals Li are defined successively by lower and upper threshold values Si0 and Si1, which are determined according to the recursion guidelines (IV) and (V):

$$Sj0 = S(j-1)1 + 1 \text{ with } S(j=0)1 = 0 \tag{IV}$$

$$Sj1 = S(j-1)1 + \frac{N * Rj}{\sum Ri}. \tag{V}$$

If a uniformly-distributed chance number between 1 and N is then generated, the machine j is selected if the chance number falls within the interval Lj.

The machine from which the next image will be requested in accordance with the local image-administration approach is selected as summarized below:

1. The determination of all ranking-order values Ri;
2. The determination of the intervals with the threshold values Sj0 and Sj1 for all machines j according to (IV) and (V);
3. The determination of a chance number Z between 1 and N; and
4. The determination of the machine j for which $Sj0 \leqq Z \leqq Sj1$.

A pool configuration of three sorting machines M1, M2 and M3 is considered by way of example. The histogram-like degree-of-fullness information of the operating-time paths H1, H2 and H3 is known at a time t1, and is illustrated by the following table.

| Sorting machine | D1 | D2 | D3 | D4 | D5 | D6 | D7 | D8 | D9 | D10 | D11 | D12 |
|---|---|---|---|---|---|---|---|---|---|---|---|---|
| M1 (t1) | 2 | 3 | 4 | 5 | 6 | 7 | 3 | 0 | 0 | 0 | 0 | 0 |
| M2 (t1) | 3 | 4 | 5 | 6 | 7 | 8 | 9 | 5 | 6 | 3 | 0 | 0 |
| M3 (t1) | 4 | 5 | 6 | 5 | 4 | 0 | 0 | 0 | 0 | 0 | 0 | 0 |

A simple, nonlinear approach for calculating the ranking-order value is realized according to (IIe)

$$Ri = \sum_{i=io}^{k} (Di^2)$$

and, with a corresponding selection of io, this approach evaluates the square of the highest histogram index with a value not equal to zero. The quadratic weighting causes the "weight" to increase progressively as a mailed item spends more time in the operating-time path. This is advantageous with respect to maximizing the online rate; in other words, the number of images that pass the operating-time path uncoded is minimized.

The indices that are decisive for determining the ranking are D7 for M1, D10 for M2 and D5 for M3. Consequently, the ranking-order values at the observed time t1 are as follows:

R1(t1)=49

R2(t1)=100

R3(t1)=25.

Thus, the three intervals result as:

Interval 1: S10=1 through S11=28

Interval 2: S20=29 through S21=86

Interval 3: S30=87 through S31=100.

It was assumed that N=100. If a number between 1 and 100, for example 73, is determined through a uniformly-distributed chance process, the next image is requested from the sorting machine or OCR 2, because the number 73 falls within interval 2.

Mailed items that exit the operating-time path of a sorting machine without an available encoding result are offline items. The images of these items are stored in the local image-administration units. The stored offline images are transmitted to the video-encoding locations at their request if no online images are available in the operating-time path.

The number of stored offline items in a processing machine ILV can be used as an offline ranking-order value, in addition to the histogram-like degree-of-fullness information, for optimizing the offline encoding.

It will be understood that the above description of the present invention is susceptible to various modifications, changes and adaptations, and the same are intended to be comprehended within the meaning and range of equivalents of the appended claims.

What is claimed is:

1. A method of determining distribution information which is located on the surface of mailed items, the mailed items being processed in a plurality of processing machines (ILV) so that images of the mailed-item surfaces containing the distribution information are recorded in each processing machine and the distribution information is read automatically, the mailed items being provided with an appropriate code following unambiguous recognition of the distribution information during FIFO temporary storage of the mailed items in a mechanical operating-time path, and the mailed items whose distribution information is not automatically recognized unambiguously being manually encoded, said determining distribution information method comprising the steps of:

transmitting the images with the distribution information to at least one video-encoding location (VCD) and encoding the images at the at least one video-encoding location, storing and administering the images of the mailed items whose distribution information was not automatically recognized unambiguously during the FIFO temporary storage of the items in each processing machine (ILV), generating, at regular time intervals, status information Hi about the degree of fullness of the mechanical operating-time path at equidistant points in time over the entire storage time in each processing machine, exchanging regularly the status information Hi for the operating-time paths between each one of the plurality of processing machines (ILV), determining, in each processing machine (ILV), ranking-order values Ri from current status information Hi at regular intervals, the respective ranking-order value being dependent on the level of fullness of the mechanical operating-time paths, and requesting, as needed, the current ranking-order values Ri of all of the processing machines from a processing machine, wherein, from these ranking-order values Ri, the video-encoding location performs a chance-superposed selection of the processing machine from which the next image having the distribution information to be encoded will be requested, with the current ranking-order values Ri being superposed with an individual chance process such that the probability of an image request is proportional to the relative size of the machine's ranking-order values Ri.

2. The method as defined in claim 1, wherein the ranking-order value Ri is determined from the sum of the mailed items located in the operating-time path at different delay times, the items being evaluated with the duration of their delay Di.

3. The method as defined in claim 2, wherein the duration of the delay Di is incorporated in linear fashion into the ranking-order value Ri.

4. The method as defined in claim 2, wherein the duration of the delay Di is incorporated in nonlinear fashion into the ranking-order value Ri.

5. The method as defined in claim 1, wherein the ranking-order value Ri is the sum of the mailed items Ni currently located in the operating-time path according to the equation:

$$Ri = \sum_{i=0}^{k} Ni.$$

6. The method as defined in claim 1, wherein only the mailed items that spend a longer time in the operating-time path are used in determining the ranking-order value.

7. The method as defined in claim 1, wherein the step of determining ranking-order values further includes incorporating a machine-related evaluation factor into the ranking-order value.

8. The method as defined in claim 1, wherein the rank-order values Ri requesting step includes selecting the processing machine (ILV) from which the respective video-encoding location (VCD) will request the next image by forming a chance number in a whole-number range for all of the video-encoding locations, the chance-number range being divided into intervals associated with the processing machines, the size of the chance-number range being determined by the ranking-order values, and the image being requested from the processing machine associated with the number range in which the chance number lies.

9. The method as defined in claim 1, wherein, in video-encoding locations that operate in different encoding modes, the steps of administering the images, determining the ranking-order values and selecting the processing machines are effected separately according to mailed items for the different modes.

10. An arrangement for determining distribution information located on the surface of mailed items, the arrangement comprising a plurality of processing machines (ILV) that each have an image-recording device for mailed items that have been separated out and have distribution information, an adjoining OCR system for automatic recognition and encoding of distribution information on the surface of mailed items, a mechanical operating-time path in which the mailed items to be processed are stored temporarily in accordance with a FIFO rule following the image recording, the distribution information being determined and encoded during this time, and a barcode printer for the encoded distribution information, the arrangement further including a video-encoding location, which is connected to the processing machines by way of a network for manual encoding of the distribution information that was not recognized unambiguously by the OCR systems, wherein each processing machine (ILV) further includes an image-administration unit (LIC) for the images of the mailed items located in the operating-time path whose distribution information was not recognized unambiguously by the OCR system, the image-administration units (LIC) are connected to one another and to the video-encoding location (VCD) by way of the network, in each image-administration unit (LIC), the times at which the mailed items enter the associated operating-time path are registered, and, from these times, status information Hi about the degree of fullness of the operating-time paths is formed at regular time intervals over a delay operating time, this status information Hi from the image-administration units (LIC) of all of the processing machines is regularly exchanged among the machines via the network, so that the status information Hi for all image-administration units (LIC) is present in each image-administration unit (LIC), in each processing machine (ILV), ranking-order values Ri are determined from the current status information Hi at regular intervals, the respective ranking-order value being dependent on the level of fullness of the mechanical operating-time paths, and as needed by the image-administration unit (LIC) of a processing machine (ILV), the video-encoding location (VCD) requests the current ranking-order values Ri of all of the processing machines (ILV), and, from these ranking-order values Ri, the video-encoding location performs a chance-superposed selection of the processing machine (ILV) from which the next image having the distribution information to be encoded will be requested, with the current ranking-order values Ri being superposed with an individual chance process such that the probability of an image request is proportional to the relative size of the machine's ranking-order values Ri.

11. An arrangement according to claim 10, wherein a plurality of video-encoding locations are provided, the image-administration units are connected to one another and to the plurality of video-encoding locations by the network, and each vide-encoding location requests the current ranking-order values Ri of all of the processing machines.

* * * * *